F. OPPENHEIM.
Vehicle-Seat.
No. 196,821.  Patented Nov. 6, 1877.
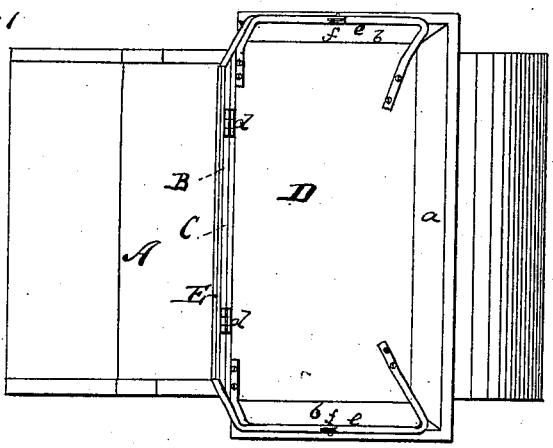
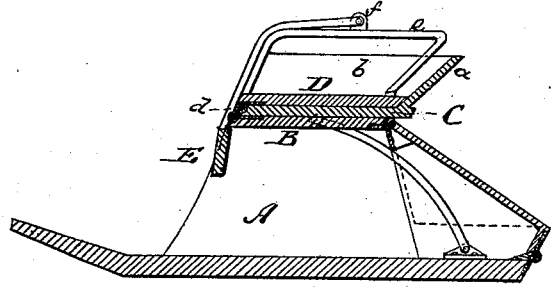
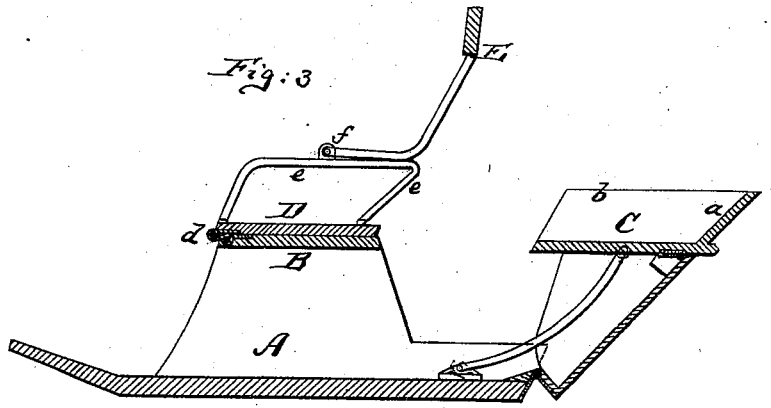
Witnesses:
John C. Tunbridge
D. v. Briesen
Inventor:
Fred'k Oppenheim
by his attorney
A. v. Briesen

UNITED STATES PATENT OFFICE.

FREDERICK OPPENHEIM, OF SAN FRANCISCO, CALIFORNIA.

IMPROVEMENT IN VEHICLE-SEATS.

Specification forming part of Letters Patent No. 196,821, dated November 6, 1877; application filed October 3, 1877.

*To all whom it may concern:*

Be it known that I, FREDERICK OPPENHEIM, of San Francisco, in the county of San Francisco and State of California, have invented a new and Improved Vehicle-Seat, of which the following is a specification:

Figure 1 is a plan or top view of my improved vehicle-seat. Fig. 2 is a vertical longitudinal section of the same, showing it folded together. Fig. 3 is a vertical longitudinal section of the same, showing it folded apart.

Similar letters of reference indicate corresponding parts in all the figures.

This invention relates to improvements on the vehicle-seats which are described in Letters Patent Nos. 174,148 and 184,656, granted to me February 29, 1876, and November 21, 1876, respectively.

The principal object of the present invention is to provide the immovable seat with side rails for supporting the back, which side rails shall be less far apart than those of the folding seat.

In my aforementioned Letters Patent the immovable seat had either no side rails at all, as in Patent No. 184,656, or it had side rails which were farther apart than those of the folding seat, to admit the latter between them, as in Patent No. 174,148. Both arrangements are obviously objectionable.

My present invention consists in combining, by doubly-jointed hinges, an additional folding seat-board, carrying the side rails for the immovable seat with the latter, so that said additional seat-board, when the seats are separated, may be folded over the immovable seat, while, when the seats are placed together, it may be folded over the movable seat. In the latter case the side rails of the extra seat-board will be between the side rails of the movable seat.

The invention also consists in combining said extra seat-board with a hinged back, which can be swung forward when the seats have been placed together, as hereinafter specified.

In the accompanying drawings, the letter A represents the vehicle-body; B, the fixed seat, or a corresponding rigid support for the seat C; and C, the folding seat, these parts being arranged, with reference to each other, substantially as described in the aforementioned Letters Patent.

The folding seat C has a back, $a$, and side rails or arm-rests $b$, affixed thereto, in substantially the manner illustrated in Patent No. 174,148.

To the front edge of the fixed seat B is hinged, by doubly-jointed hinges $d\ d$, an extra seat-board, D, which, when the two seats are separated, as in Fig. 3, may be folded upon the seat B, and which is provided with side rails $e\ e$ and with a back, E, as shown. These side rails $e$ and back E are for use on the seat B, as clearly shown in Fig. 3. The distance of the rails $e\ e$ from each other is less than the space between the rails $b\ b$ of the seat C.

When the seat C is folded upon the seat B, the extra seat-board D is folded over the seat C, as in Figs. 1 and 2, the doubly-jointed hinges $d$ permitting this position of the board D. The rails $e\ e$ are, in this position, between the rails $b\ b$, as shown in Fig. 1. The back E is, at $f\ f$, pivoted to the side rails $e\ e$, or to the body of the board D, so that said back may either be swung up for use, as in Fig. 3, or forward, out of the way, as in Fig. 2.

The back E is only needed for the seat B when the seats are separated, as in Fig. 3; but when they are folded together it is replaced by the back $a$ of the seat C, and is no longer required.

When the back E is folded forward, as in Fig. 2, it constitutes a curtain in front of the seats.

As far as the use of the folding back E is concerned, it is immaterial whether the board D be used or not, as said back, if hinged directly to the fixed seat B, will answer the purpose above referred to.

I claim as my invention—

1. The combination of the fixed seat B and folding seat C with the extra seat-board D and doubly-jointed hinges $d$, substantially as herein shown and described.

2. The combination of the folding seat C, having side rails $b\ b$, with the fixed seat B, folding seat-board D, having rails $e\ e$, the distance between the rails $e\ e$ being less than that between the rails $b\ b$, substantially as herein shown and described.

3. The combination of the folding seat C with the fixed seat B and folding back E, all operating so that the back E is folded forward when the seat C is folded upon the fixed seat, substantially as herein shown and described.

FREDK. OPPENHEIM.

Witnesses:
  A. V. BRIESEN,
  ERNEST C. WEBB.